No. 886,087. PATENTED APR. 28, 1908.
J. N. STERN.
STEAM SUPERHEATER.
APPLICATION FILED DEC. 17, 1907.

2 SHEETS—SHEET 1.

Witnesses:
Clarissa Franch
Elsie Lohr

Inventor
Joel Nikolaus Stern
by his Attorney

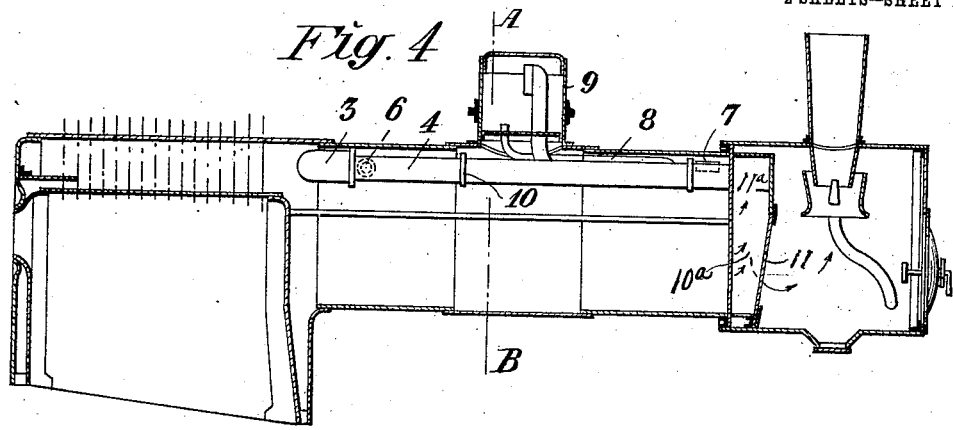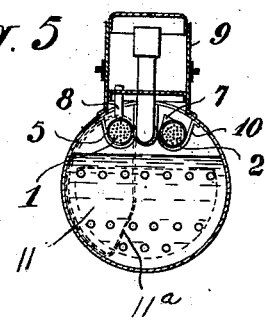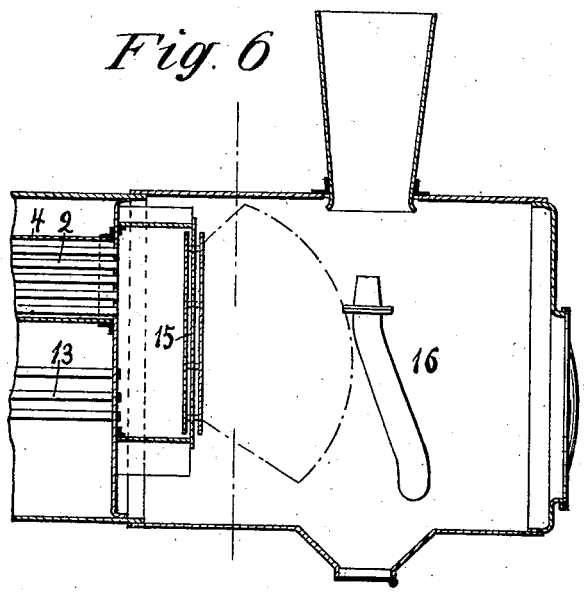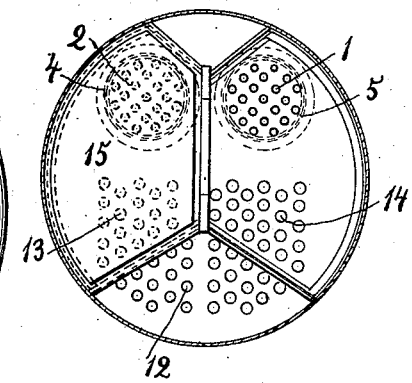

UNITED STATES PATENT OFFICE.

JOEL NIKOLAUS STERN, OF FALUN, SWEDEN, ASSIGNOR OF ONE-HALF TO HUGO THEODOR TILLQUIST, OF STOCKHOLM, SWEDEN.

STEAM-SUPERHEATER.

No. 886,087.   Specification of Letters Patent.   Patented April 28, 1908.

Application filed December 17, 1907. Serial No. 406,894.

*To all whom it may concern:*

Be it known that I, JOEL NIKOLAUS STERN, a subject of the King of Sweden, and resident of 7 Svärdsjögatan, Falun, in the Kingdom of Sweden, engineer, have invented certain new and useful Improvements in Steam-Superheaters for Steam-Generators, of which the following is a specification, reference being made to the accompanying drawings.

The present invention relates to steam superheaters for use in steam generators, and refers especially to that class of superheaters which comprise combustion gas pipes arranged in the steam chamber, the pipes being surrounded by the steam to be superheated. In this class of superheaters it has heretofore been the practice to arrange the pipes through which the combustion gases pass longitudinally of the steam chamber, one end of each pipe being fastened in each end wall of the chamber. Owing to the difference in expansion between the highly heated gas pipes and the less heated walls of the steam chamber (which is somewhat cooled by the water therein) the joints between pipes and walls are detrimentally affected, it being virtually impossible to maintain these parts tightly joined, as they should be, for any length of time.

The object of the present invention is to overcome the defect in construction above pointed out, and so to join the pipes to the steam chamber that there will be no danger of the parts becoming loosened. This object is accomplished by arranging the combustion gas pipes in such a manner that they are fastened in but one wall of the steam chamber, preferably one of the end walls thereof, thus permitting the expansion and contraction of the pipes to take place without in any manner endangering the security of their fastening or joints with the wall which supports them.

Figure 1:
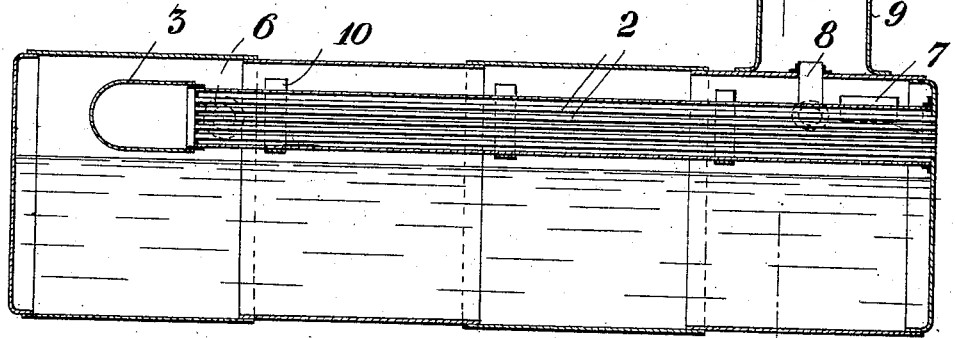
Figure 2:
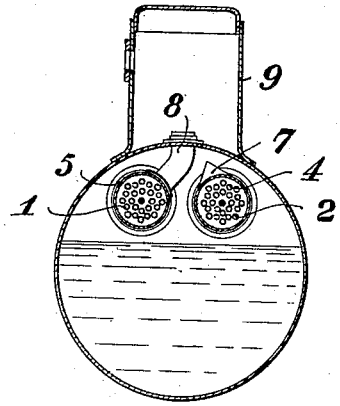
Figure 3:
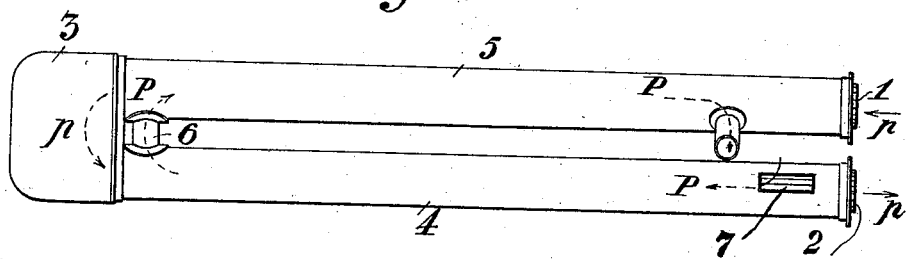

For the purpose of clearly describing the invention I have appended the accompanying drawings, wherein Figure 1 is a longitudinal sectional view of a boiler heated externally; Fig. 2 is a transverse sectional view thereof on the line C—D of Fig. 1; Fig. 3, is a top plan view of the superheating arrangement used in connection with the boiler illustrated in the two preceding figures; Fig. 4 is a longitudinal sectional view of a locomotive boiler; with my invention applied thereto; Fig. 5 is a transverse sectional view thereof on the line A—B of Fig. 4; Fig. 6 is a longitudinal sectional view of a portion of a locomotive boiler and its smoke chamber; and Fig. 7 is a vertical sectional view through the smoke chamber of the locomotive boiler illustrated in the preceding figure.

The preferred form of the invention comprises a plurality of combustion gas pipes 1 and 2, brought together in groups (two or a multiple of two groups being preferred) each group being contained in and surrounded by steam pipes 4 or 5. The gas pipes may be U-shaped and continuous, having both ends thereof secured in one wall, preferably the end wall of the boiler, or there may be a series of independent parallel pipes, one end of each pipe being secured in one wall of the boiler and the other end of each pipe being secured to one wall of a chamber 3, the latter serving as a connecting chamber between the incoming and outgoing gas pipes. The steam pipes 4 and 5 which surround the gas pipes are interconnected by a suitable pipe 6, arranged near the connecting chamber 3. One of the steam pipes is provided with a steam inlet 7, the other pipe being provided with an outlet pipe 8, through which the superheated steam passes by way of the dome 9 to the motors to be operated thereby.

For the purpose of fully utilizing the heating properties of the gas, the latter is preferably caused to move in a direction opposite to that in which the steam moves. The gases are caused to enter and pass through the pipes 1, through the connecting chamber 3 and out through the pipes 2 to a suitable flue, smoke chamber, economizer or the like the inlet and emission points of the gas being indicated by the arrows *p p* (Fig. 3). The course of the steam is indicated by the arrows P, P, its point of entrance being through the inlet 7, then into and through the pipes 4, 6 and 8 and out at the dome 9 to be utilized as desired.

The superheating arrangement just described is preferably supported in the boiler by bows 10, secured to the interior wall thereof, and expansion and contraction of the superheater in a longitudinal direction is not hindered or prevented. The steam pipes 4 and 5 are so joined to the end plate of the boiler and to the connecting chamber 3 that their expansion and contraction will in no manner detrimentally affect the tightness of the joints.

In the form of the invention shown in Figs. 4 and 5, a simple means is provided for directing the gases upwardly into the inlet ends of the gas pipes. This means consists of a chamber 10ª, inclosing the outer ends of the boiler fire tubes or a part of such fire tubes, and the inlet ends of a group of the gas pipes, so that the gases from the fire tubes are directed upwards into the inlet ends of the gas tubes. This chamber includes a vertical wall 11ª, and a removable end plate 11, as clearly shown in Figs. 4, and 5, said plate 11, being removable to permit cleaning of the tubes inclosed by said chamber 10ª.

In Figs. 6 and 7 I have illustrated an arrangement for regulating the degree to which the steam is superheated. 12, 13 and 14 indicate a plurality of groups of pipes or tubes extending through the water space in the boiler. Secured in proximity to the ends of these tubes is a door 15, which may be swung about a vertical axis and may be so operated as to place the series of pipes 13 and 2, or the series of pipes 14 and 1 in communication with each other, the pipes 12 at all times being in communication with the smoke chamber 16. When the door is swung about its axis in the direction of the lateral group of pipes a closed compartment is formed which is separated from the smoke chamber, and when the door is in the position shown in Fig. 7, this closed compartment causes the gas pipes 13 and 2 to be placed in communication, whereby the combustion gases pass in the same direction as the steam, which it will be remembered enters the pipe 4 and passes out through the pipe 5. If the door is swung so as to form a closed compartment in front of the pipes 14 and 1, the gas will flow in a direction opposite to that of the steam. When combustion gases flow in a direction opposite to that in which the steam is passing, the latter will be superheated to a greater degree than if the combustion gases and steam flow in the same direction.

It is of course obvious that the door 15 may be locked in either of its positions, and may be made of any desired size to include all the pipes or only part of the pipes of the several groups in the closed compartment which it forms.

Having now described my invention, what I claim as new and desire to secure by Letters Patent is:—

1. In a steam superheater, the combination with a steam chamber, of groups of gas pipes secured at one end in a wall of the steam chamber, a steam pipe surrounding each group of gas pipes, a chamber supported by the ends of the steam pipes but closed thereto, said chamber being in communication with said gas pipes, and a conduit connecting said steam pipes.

2. In a device of the character herein described, the combination with a steam chamber, of a plurality of gas pipes extending thereinto and secured in one wall only of the steam chamber, and a connecting chamber arranged within said steam chamber and adapted to retain the ends of the gas pipes within said steam chamber and provide for communication between said pipes.

3. In a device of the character herein described, the combination with a steam chamber, of a plurality of gas pipes arranged in groups and extending into the steam chamber, each pipe having one end thereof secured in one end wall of the steam chamber, the other end stopping short of the opposite wall of the steam chamber, a connecting chamber for establishing communication between the several gas pipes within the steam chamber, and a steam pipe surrounding each group of gas pipes.

4. In a device of the character described, the combination of a steam chamber, groups of lower and superposed gas pipes connected at one end to a wall of the chamber, means for establishing communication between some of the superposed pipes and some of said lower pipes, and a steam pipe surrounding each group of superposed pipes, said groups of superposed pipes being in communication with each other.

5. In a device of the character herein described, the combination with a steam chamber, of the groups of gas pipes 1 and 2 therein, the groups of gas pipes 13 and 14, below the pipes 1 and 2 respectively, and the door 15 designed to place the groups 2 and 13 or 1 and 14 in communication.

6. In a device of the character described, the combination of a steam chamber, a plurality of groups of gas pipes mounted at one end in a wall of the chamber, a chamber connecting the inner ends of said gas pipes to establish communication between said groups, a steam pipe surrounding each group of pipes, an inlet to one steam pipe, an outlet to another, and a connection for establishing communication between said steam pipes.

7. In a device of the character described, the combination with a steam generating chamber having an end wall and a plurality of fire tubes opening through said wall, of groups of gas tubes arranged in the steam space of the boiler above said fire tubes, said gas tubes being secured in and opening through said wall, a chamber connecting the inner ends of said groups, a steam pipe surrounding each group, one of said steam pipes having an outlet and another an inlet, a connection between said steam pipes, and a chamber inclosing the ends of some of said fire tubes at said wall and the ends of the pipes of some of the groups of gas pipes.

8. In a steam superheating apparatus, the combination with a fire-tube boiler, of a plurality of groups of gas pipes secured in one wall of said boiler, means connecting the inner ends of said groups, steam pipes surrounding each of said groups of gas pipes and connected with one another, an inlet for steam into one of said pipes and an outlet from another, and means for placing any one of said groups of gas pipes in communication with some of the fire-tubes of said boiler to pass the gases of combustion issuing therefrom through said groups.

In witness whereof I have hereunto set my hand in presence of two witnesses.

JOEL NIKOLAUS STERN.

Witnesses:
 GUST. HEUBERG,
 GERDA HERKULES.